US008359025B2

(12) United States Patent
Yang et al.

(10) Patent No.: US 8,359,025 B2
(45) Date of Patent: Jan. 22, 2013

(54) DETERMINATION OF A NETWORK PARAMETER

(75) Inventors: Xuejun Yang, Guangdong (SE); Pieer-Jean Muller, Saint Maur (FR); Michael Roberts, Neuilly sur Seine (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 183 days.

(21) Appl. No.: 12/771,307

(22) Filed: Apr. 30, 2010

(65) Prior Publication Data

US 2010/0279697 A1 Nov. 4, 2010

Related U.S. Application Data

(63) Continuation of application No. PCT/CN2007/071005, filed on Nov. 1, 2007.

(51) Int. Cl.
*H04W 4/00* (2009.01)
(52) U.S. Cl. ............... 455/426.1; 455/422.1; 455/458; 455/515; 455/450
(58) Field of Classification Search ............... 455/426.1, 455/422.1, 458, 515, 450
See application file for complete search history.

(56) References Cited

U.S. PATENT DOCUMENTS

| 2002/0126780 A1* | 9/2002 | Oshima et al. ............. 375/347 |
| 2007/0217291 A1* | 9/2007 | Jeong et al. ............. 368/21 |

FOREIGN PATENT DOCUMENTS

| CN | 1697386 A | 11/2005 |
| CN | 1848896 A | 10/2006 |
| EP | 0701 382 A1 | 3/1996 |
| GB | 2435152 A | 8/2007 |

OTHER PUBLICATIONS

3GPP TR 23.882 V1.9.0 (Mar. 2007), "3rd Generation Partnership Project; Technical Specification Group Services and System Aspects; 3GPP System Architecture Evolution: Report on Technical Options and Conclusions (Release 7)," fD.3.5, Technical Report, Mar. 2007, 184 pages.
International Search Report, International application No. PCT/CN2007/071005, Date of mailing of the international search report Aug. 14, 2008, 2 pages.
"UE-Reporting Based Network-Assigned Tracking Areas", 3GPP TSG-SA WG2 #53 meeting, Agenda Item 7.5.1.1, Jun. 26-30, 2006, 6 pages, NEC.
"Reported List of Last Visited Tracking Areas" 3GPP TSG RAN WG3 Meeting #56, Agenda Item 13.2.2.13, May 7-11, 2007, 4 pages, Mitsubishi Electric.
Written Opinion of the International Searching Authority, International Application No. PCT/CN2007/071005, Dated: Nov. 1, 2007, 4 pages.

(Continued)

*Primary Examiner* — Nghi H Ly

(57) ABSTRACT

A method of determining a network parameter in a telecommunication system is disclosed. The system has a coverage area including at least two sub-areas, and also includes a User Equipment (UE) being in idle mode and being registered in at least two of these sub-areas. According to the present disclosure, a network node in the system receives from the UE a time information relating to the time periods the UE has been present in each of the at least two sub-areas it is registered in, respectively, and then this time information is utilized to determine a network parameter in the system.

18 Claims, 7 Drawing Sheets

OTHER PUBLICATIONS

3$^{rd}$ Generation Partnership Project, Technical Specification Group Services and System Aspects, 3GPP System Architecture Evolution, Report on Technical Options and Conclusions, Release 7, 2007, 184 pages.

European Search Report, European Application No. 07817196.4-1249, PCT/CN2007071005, Dated: Mar. 1, 2011, 6 pages.

First office action of corresponding Chinese Patent Application No. 200780101072.3 mailed on May 3, 2012, and English translation thereof, 19 pages total.

First office action of corresponding European Patent Application No. 07817196.4, mailed on Apr. 10, 2012, 4 pages total.

* cited by examiner

DETERMINATION OF A NETWORK PARAMETER

This application is a continuation of co-pending International Application No. PCT/CN2007/071005, filed on Nov. 1, 2007, which is hereby incorporated by reference in its entirety.

TECHNICAL FIELD

The present invention relates generally to communication systems and methods and, in particular embodiments, to the determination of a network parameter.

BACKGROUND

Telecommunication systems of today, such as, for example Global System for Mobile communications (GSM), Wideband Code Division Multiple Access (WCDMA) systems, (Long Term Evolution) LTE and Universal Mobile Telecommunications System (UMTS), include at least one User Equipment (UE) or Mobile Station (MS), a Radio Access Network (RAN) and a Core Network (CN). (Hereafter in this document, UE will be used as a generic term for UE, MS and any other mobile transceiver in such a system.) The UE attaches to the CN through the RAN in order to get service connectivity, thereby establishing a UE context in the CN and RAN. The UE context defines values for a number of various network parameters for the created session, the network here including RAN and CN.

Once the UE context has been established between the UE and the network, a communication link between the UE and the network may be formed to transmit modulated information carrying signals based on those network parameters. When information carrying signals are no longer transmitted on the communication link, the UE does not necessarily have to maintain this communication link. Instead, after such a communication has terminated, the UE is usually set to idle mode to save battery power. In the UE idle mode, the UE context in RAN is typically removed but the UE context in CN still remains.

One of the most important reasons for maintaining UE context in CN for UE idle mode is to support Mobility Management (MM). The MM function, for a UE which is not actively engaged in a communication, keeps track of the location of the UE with the accuracy of a defined area in the system.

Such defined areas have been denoted differently in different systems. For instance, this area is denoted as a Tracking Area (TA) in SAE/LTE (System Architecture Evolution/Long Term Evolution), Location Area (LA) or Routing Area (RA) in GSM, and Universal Terrestrial Radio Access Network (UTRAN) Registration Area (URA), LA of RA in UMTS. Hereafter in this document, unless otherwise stated, TA will be used as a generic term for TA, LA, RA, URA, and other corresponding denotations, which is in correspondence with what is used in the 3GPP standardization work. (See chapter 7.3.1 in "3GPP TR 23.882 V1.9.0 (2007-03)".)

In more general terms, a telecommunication system has a coverage area being made up of sub-areas in which a UE can be registered in when being in idle mode. The system will in UE idle mode be able to locate the UE to such a sub-area. Such a sub-area can thus, for example, consist of the above defined TAs, but also of any other area, in which a UE is registered when being in UE idle mode for the purpose of allowing the system to keep track of the UE. Sub-areas in a system can be arranged in one or more layers. For cellular systems, these sub-areas include at least one cell, and normally they include a plurality of cells.

Hereafter, for simplicity reasons, the present invention will be explained mainly in the terms of TAs and LTE. The invention is, however, not limited to this specific implementation. The present invention is instead applicable to all communication systems having sub-areas as defined above.

In each cell of the system, the corresponding TA Identifier (TA ID) is broadcasted on the air interface, so that a UE roaming these cells can know whether its TA has changed or not. The UE does this by comparing its last registered TA ID with the one received from the air interface in the current cell. In the case where the UE enters a new TA, a particular MM procedure, Tracking Area Update (TAU), is carried out to register the presence of the UE in the new TA. (TAU is here used as a generic term for the corresponding procedures in LTE, GSM, UTRAN and UMTS. Thus, the term TAU here also includes, e.g., Location Area Update (LAU) and Routing Area Update (RAU).) When the network gets incoming data for a UE in idle mode, the network locates the UE to the TA in which the UE is registered, and then pages the UE on a paging channel in the cells belonging to that TA.

TA configuration needs to take both LA/RA/TA update and paging load into account. TA should be configured as small as possible to keep the paging load within an acceptable level, but as large as possible to avoid too much TAU signaling.

In LTE, Multiple Tracking Area (MTA) has been proposed to enable Non Access Stratum (NAS) signaling optimization by dynamic TA configuration. In MTA, the UE is registered in one or more TAs, the one or more TAs constituting a registration area, in which the UE is registered during idle mode. Conceptually, the use of such a registration area is quite similar to existing RA in GSM EDGE Radio Access Network (GERAN)/UTRAN today. Each cell in the network broadcasts one TA ID for each CN operator. When the idle UE enters a TA in which it has never been registered, the UE will initiate a TAU procedure to register in this TA. Registration area registration allows for more than one TA to be assigned to a UE through a single TAU procedure, and the additional TAs are treated in the same manner as in the single TA case. As long as the UE roams within TAs it has already been assigned to, it does not need to perform any other TAU than periodical updates.

FIG. 1 shows an example of such a registration area. Here, a UE being located in the border area between three TAs registers with all of the three tracking areas, TA1, TA2 and TA3. Within the area being defined by the outermost line, enclosing an area consisting of TA1, TA2 and TA3, TAU signaling is reduced considerably. TAU signaling is here reduced because only periodic updates need to be performed, since no TAUs have to be performed when roaming from one TA to another within this area.

Employing the registration area concept, it is possible to avoid unnecessary TAU and paging overhead by dynamically reconfiguring TAs assigned to a particular UE according to a certain criteria. A number of ideas on how to dynamically reconfigure TAs for a UE has been discussed within the 3rd Generation Partnership Project (3GPP), for example, has UE-reporting based network-assigned TA approach been proposed, where UE provides some information assisting CN to detect a stationary UE and accordingly assign a small number of TAs to it, which helps reduce paging signaling efficiently.

In a typical registration area concept, which has been specified in the LTE standardization work of today, only one CN identity, called SAE Temporary Mobile Subscriber Identity (S-TMSI), is used for the UE in all TAs being assigned to the UE, i.e., the TAs present in the assigned TA list. When the UE moves to a new cell belonging to a new TA but still in the assigned TA list, it can use one of the old TA IDs plus the S-TMSI as a valid identity and does not need to perform a TAU.

The TAs assigned to the UE may either be managed by one single Mobile Management Entity (MME) node of the CN or more than one MME nodes. In the case of more than one MME nodes, each of the MME nodes maintains a MM context for the UE and they coordinate with each other.

In the case where the UE has registered with multiple Radio Access Technologies (RATs), i.e., the TAs in which the UE is registered utilize different RATs, the system typically maintains multiple mobile management contexts, each of which assign one identifier for the UE. For example, one S-TMSI is assigned in LTE and one Packet-TMSI (P-TMSI)/TMSI is assigned in UMTS.

In prior art systems, where UEs in idle mode are registered in multiple sub-areas, such as TAs, there exists a problem related to determination of network parameters in the system, such as, for example, paging related network parameters.

In order to be able to determine these network parameters in a correct way, it is necessary for the system to know the behavior of the UE in the system. In the prior art systems, it has not been possible for the systems to closely enough follow the behavior of the UE, which has resulted in an inaccurate determination of the network parameters in the system.

Inaccurate determination of the network parameters has further resulted in a sub-optimized overall performance of the prior art systems.

SUMMARY OF THE INVENTION

The present disclosure relates generally to a network node, a telecommunication system and a method of a network node for determining network parameters in a telecommunication system having a coverage area including at least two sub-areas, where the system including a User Equipment (UE) being in idle mode and being registered in at least two of the sub-areas.

The present disclosure also relates generally to a UE and a method of a UE for reporting information in a telecommunication system having a coverage area including at least two sub-areas, wherein a User Equipment (UE) is in idle mode and is registered in at least two of the sub-areas.

The present disclosure also relates to a computer program and a computer program product for implementing the methods of the invention.

The present disclosure provides a determination of network parameters that solves or at least mitigates the above stated problem.

The present disclosure aims to provide a more accurate determination of the network parameters than the ones known from the prior art systems.

A method of determining a network parameter is provided, in which the method performs the processes of:

in a network node in the system, receiving from the UE a time information relating to the time periods the UE has been present in each of the at least two sub-areas it is registered in, respectively; and utilizing the time information to determine a network parameter in the system.

A method of reporting information is provided, in which a UE in the system performs the processes of:

determining a time information relating to the time periods the UE has been present in each of the at least two sub-areas it is registered in, respectively; and reporting the time information to a network node in the system.

A computer program is provided, including code means, which when run in a computer causes the computer to execute the above mentioned methods.

A computer program product is provided, including a computer readable medium and the above mentioned computer program, wherein the computer program is included in the computer readable medium.

A network node is provided, which includes:

a module, configured to receive a time information relating to the time periods the UE has been present in each of the at least two sub-areas it is registered in, respectively; and a module, configured to utilize the time information to determine network parameters in the system.

A UE is provided, which includes:

a module, configured to determine a time information relating to the time periods the UE has been present in each of the at least two sub-areas it is registered in, respectively; and a module, configured to report the time information to a network node in the system.

A telecommunication system is provided, which includes the above mentioned network node and UE.

The methods, network nodes, UEs, systems, computer programs and computer program products according to the present disclosure are characterized in that they utilize information of the behavior of the UE for determining network parameters in the system. More in detail, the UE behavior is identified by having the UE reporting time information relating to the time periods it has been present in each of the sub-areas it is registered in.

By reporting this time information in this detailed way, the network has the possibility to make intelligent estimations of how the UE will behave in the present and in the future in the system. The network has thus a chance to determine network parameters for the system in a very exact manner, thanks to this reported time information.

Further, according to an embodiment of the present invention, the network parameters to be determined relate to paging. Thus, the reported time information, including information of the time the UE spent in each of the sub-areas it is registered in, is in this embodiment used to determine where to page the UE. The UE is paged in the sub-area where it is most probably present, such as in the sub-area in which it has spent the most time lately or in the sub-area from which the last time information report was sent. Paging based on network parameters determined in accordance with the present disclosure is optimized and in the meantime being very exact and having a small amount of paging overhead and NAS signaling.

Further, according to an embodiment of the present invention, the network parameters to be determined relate the contents of a list of sub-areas in which the UE is registered. Here, the list of sub-areas is updated based on the time information reported by the UE. In this embodiment of the invention, the list of sub-areas is updated in accordance with the behavior of the UE, which makes it possible to page the UE efficiently with low paging overhead and NAS signaling.

Both of the embodiments of the invention relating to paging and to the contents of the list of sub-areas assist the whole procedure of having the UE registered in multiple sub-areas so that signaling in connection with sub-area updates, such as TAU signaling, is decreased.

Further, according to an embodiment of the present invention, the network parameters to be determined relate to network resource allocation. Here, the resource allocation in the network and in the core network follows the behavior of the UE in the system. Based on the time information reported by the UE, resources are allocated and released in accordance with the actions of the UE. This makes it possible for the network to allocate resources in a very exact way in the system, enhancing the overall performance of the system. For instance, if the network, from the time information, notices that the UE has not been present for a long time in a sub-area in which it is registered, the network can release the resources that are reserved for the UE in that sub-area. These released network resources can then, of course, be allocated to another UE in need of network resources, and thereby efficiently used.

Further, according to an embodiment of the present invention, the network parameters to be determined relate to radio planning Here, the network closely follows the time periods spent in each of the sub-areas the UE is registered in, and if the UE without an acceptable reason jumps from one sub-area to another, the network can conclude that the reason for these jumps is that there are coverage problems in the sub-areas. This embodiment offers a very simple and efficient way of finding problematic geographical areas in the system.

Also, according to an embodiment of the present invention, the sub-areas are TAs, where such TAs also include RAs, URAs or the like. These sub-areas may be arranged in one layer in the system, or are arranged in at least two layers. Each of these layers may utilize the same or a different access technology, such as LTE, UMTS, GSM, WiMAX, CDMA2000, or essentially any other access technology.

Detailed exemplary embodiments and advantages of the methods and apparatus according to the invention will now be described with reference to the appended drawings illustrating some embodiments.

DETAILED DESCRIPTION OF ILLUSTRATIVE EMBODIMENTS

Figure 1:
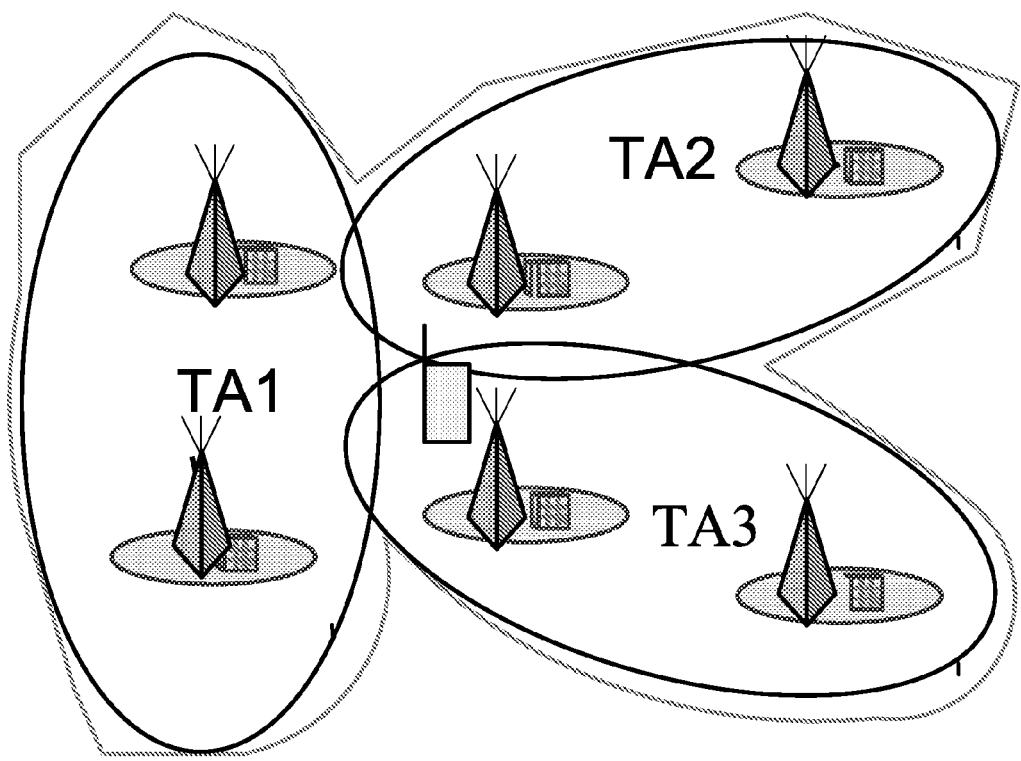
FIG. 1 shows an example of a registration area.

As stated above, a sub-area can, for example, consist of the above defined TAs, but also of any other area, in which a UE is registered in when being in UE idle mode for the purpose of allowing the system to keep track of the UE.

As telecommunication systems are developed and are adapted to meet the demands of the users of the systems, it is likely that one geographical area can be covered by multiple network technologies. One example of such a situation can be a situation where one of the technologies covers a large area, such as a sea area, while other technologies cover a smaller high capacity area within the large area, such as an island area in the sea. The smaller area within the large area will probably have to fulfill higher capacity requirements than the larger area or has to provide some special services not needed in whole of the large area.

Such systems, where areas are covered by multiple network technologies, are so-called multiple layer deployment systems. Further, also multiple layers using the same technologies can constitute such a multiple layer deployment. In short, multiple layer deployment is used when multiple layers utilizing the same or different technologies are arranged in an overlapping fashion.

Due to coverage issues on different layers, for instance in the island area in the above given example, a UE located in this area may leave one layer and then enter another layer and return later on. In order to reduce location update signaling, the UE in this geographical area may register with multiple layers. When the UE then roams between these multiple layers, it does not need to perform TAUs, other than periodical TAU, when entering another TA in another layer.

But, in such a system, in which a UE is registered in multiple sub-areas, such as TAs, possibly being arranged in more than one layer, it is essential for the system to try to find out the behavior of the UE in the system in order for the system to be able to determine necessary network parameters for the system.

According to an embodiment of the present invention, a UE being in idle mode and being registered in multiple sub-areas, such as TAs, records time information relating to the time periods the UE has been present in each of the sub-areas it is registered in. The UE then reports this time information to a network, which utilizes this time information to determine network parameters in the system.

By reporting to the network node the time information relating to the time periods the UE has spent in each of the sub-areas, the network can learn the behavior of the UE. By learning the behavior of the UE, the network has a better chance of guessing what the UE will do in the near future. Thus, the network can from the knowledge of this time information more accurately estimate the actions of the UE and thereby more exactly derive network parameters necessary for adapting the system so that a good performance is achieved.

The time information, relating to the time periods the UE has spent in each of the sub-areas it is registered in, can be reported to the network node in a number of ways. Hereafter is described one way of reporting this information to the network node. However, as is clear to a person skilled in the art, essentially any way of communicating this information to the network node may be used, as long as it does not add too much to the overhead signaling of the system.

Figure 2:
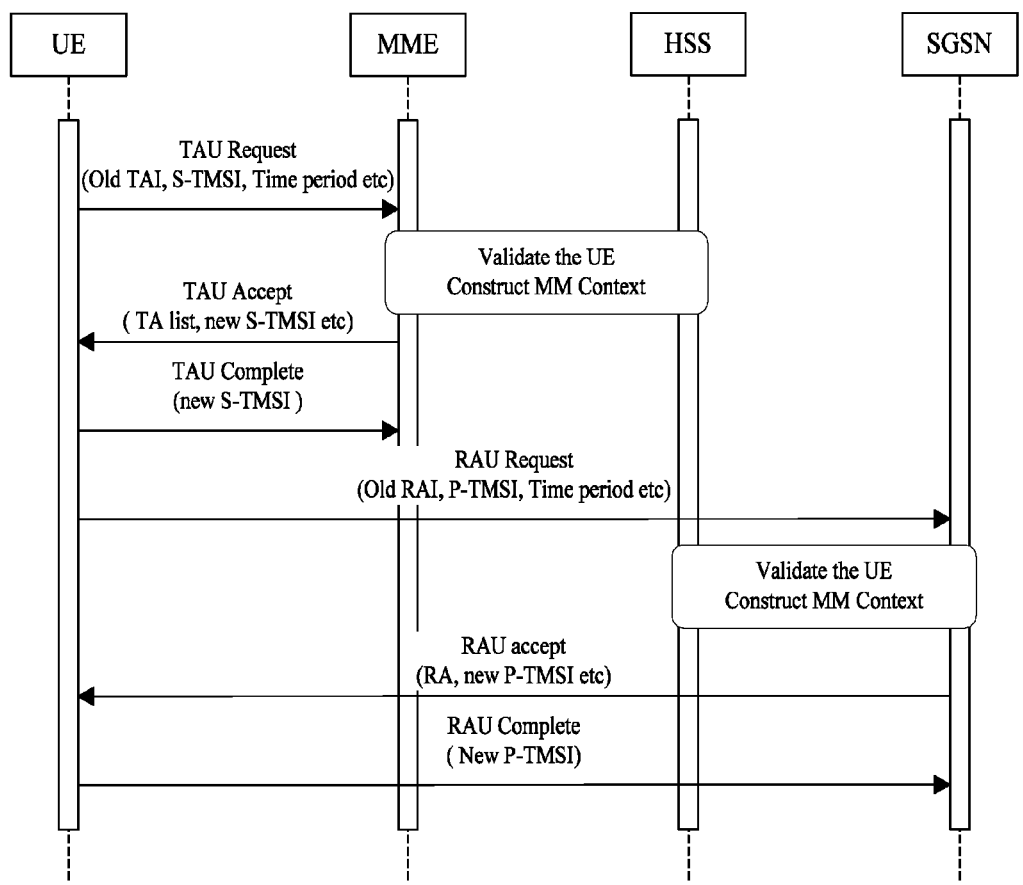
FIG. 2 shows a simplified TAU/RAU procedure according to the present disclosure.

FIG. 2 shows a simplified TAU/RAU procedure according to an embodiment of the present invention, for a situation with two layers, one LTE layer and one UMTS layer. The TAU/RAU procedure includes the processes of a "TAU/RAU Request", a "TAU/RAU accept/reject" and a "TAU/RAU complete".

A UE in idle mode entering a new TA/RA detects a change to the new TA/RA by discovering that this new TA/RA is not one of the TAs/RAs that the UE is registered in. The UE discovers this by noticing that this new TA/RA is not present in the RA or in the TA list, which specify in which TAs/RAs the UE is registered. The UE then initiates a TAU/RAU procedure by sending a TAU/RAU request message containing a number of important information elements, such as old Tracking Area identity/Routing Area Identity (TAI/RAI), old S-TMSI/P-TMSI, UE network capability.

According to an embodiment of the present invention, when the UE is registered in more than one sub-area, such as being registered in more than one TA in one or more network, the TAU/RAU Request also carries information relating to the time periods the UE has spent in each of the sub-areas, i.e., in each of the networks and TAs.

A core network node, here for the LTE/UMTS case being a MME/Serving GPRS Support Node (SGSN), validates the presence of the UE in the new TA/RA, constructs MM context for the UE and responds to the TAU/RAU request of the UE by either sending a TAU/RAU Accept if the validation is successful or a TAU/RAU Reject if the validation is unsuccessful.

A TAU Accept message can include a list of TAs assigned to the UE, which defines the multiple tracking area concept described above. After UE has received the TAU/RAU Accept message, the UE acknowledges this to the network by sending a TAU/RAU Complete message including the new received identifier S-TMSI/P-TMSI.

FIG. 2 illustrates UE reporting of time information being exemplified for a two layer LTE and UMTS system. For other systems than this specific system, procedures of these other systems, corresponding to the exemplified TAU/RAU procedures above, are performed in accordance with the present disclosure, as is clear to a skilled person. The location area definition and management scheme may differ for different networks. For example, WiMAX has its own location area definition and a management scheme in the form of paging groups. If WiMAX and LTE are overlaid on different layers in a geographic area, a procedure corresponding to the one shown in FIG. 2, in which time period information is reported through an equivalent location update procedure of WiMAX, e.g., a paging group update procedure, will be performed.

Figure 3:
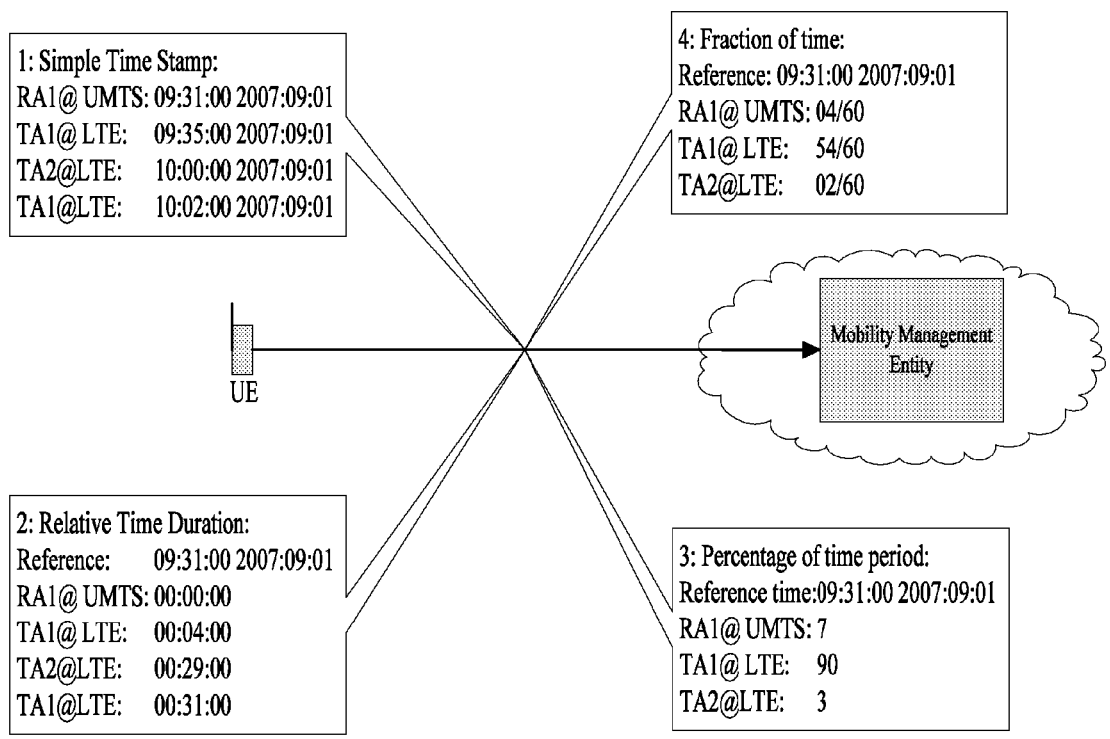
FIG. 3 shows time information examples according to the present disclosure.

FIG. 3 illustrates that there is, according to the present disclosure, a number of ways of presenting and signaling the time information to the network. Which way to be used depends on how the time information will be used at the network side, which will be discussed more below. In the example illustrated in FIG. 3, the UE reports the time information for a point in time being 09:31:00 on 1 Sep. 2007.

According to an embodiment of the present invention, the time information is presented as a simple time stamp presentation, including times and dates. The time stamp presentation is a straightforward approach to signal time period information on how much time the UE has spent in each network and sub-area.

"1: Single Time Stamp:" in FIG. 3 shows an example of such a simple time stamp presentation including information on times and dates. The UE is here registered in an UMTS and a LTE network at the same time, since 9:31:10 on 1 Sep. 2007. The UE was present in RA1 of the UMTS network from 9:31:10 on 1 Sep. 2007 until 9:35:01 on 1 Sep. 2007, when the UE went to TA1 of LTE network. At 10:00:00, the UE moved to TA2 of LTE, and so on. Thus, if the LTE network received the time period report at 10:31:00 on 1 Sep. 2007, the core network would know that the UE had been present 4 minutes in RA1 of UMTS network, 2 minutes in TA2, 25+29=54 minutes in TA1 of LTE.

According to an embodiment of the present invention, the time information is presented as a time stamp with relative time duration from the last periodic TAU procedure.

"2: Relative Time Duration:" in FIG. 3 shows an example of such a relative time duration presentation. According to this embodiment, relative time stamps and a reference time stamp are presented and signaled. Thus, dates do not have to be signaled for every time stamp. For a skilled person, it is easy to see that the relative time duration presentation is more efficient from a signaling point of view, as compared to the simple time stamp presentation, especially for the case that UE moves back and forth on border area.

According to an embodiment of the present invention, the time information is presented as a percentage of time period spent in RA/TA/LA, from the last periodic TAU procedure.

"3: Percentage of time period:" in FIG. 3 shows an example of such a percentage of time period presentation. According to this embodiment, percentages for the time spent in each of the TAs in each network and a reference time stamp are presented and signaled. Signaling of percentages of periods of time, according to this embodiment, provides a small number of bits need to be transmitted to the network.

According to an embodiment of the present invention, the time information is presented as a fraction of time from a last periodic TAU procedure.

"4: Fraction of time:" in FIG. 3 shows an example of such a fraction of time presentation. According to this embodiment of the invention, the observation time periods are explicitly displayed. For example, as shown in FIG. 3, from 9:31:00 to 10:31:00, the UE has spent 4, 54 and 2 minutes in RA1 of UMTS, TA1 and TA2 of LTE, respectively.

This embodiment is similar to the embodiment presenting percentage of time, and also has the same advantages as that embodiment. The embodiment has the further advantage that it presents an explicit indication in minutes of the time periods reported, which can be easily utilized.

Further, as has been stated above, the reported time information related to the time periods the idle mode UE has been present in the multiple sub-areas, such as TAs, in which it is simultaneously registered, can be used for determining network parameters in the system. More in detail, this time information can be used for determining network parameters relating to paging, TA lists, resource allocation, and radio planning This will hereafter be described in detail.

A UE in idle mode being registered in more than one sub-area on one or more layers requires paging being performed across more than one sub-area on one or more layers. This extensive paging procedure generates paging overhead. This increased paging overhead is usually acceptable, since the system can compensate the increased overhead with gains in location update signaling.

However, in some cases, for instance a case where an UE usually is moving from a TA in a first layer to TA in a second layer, or from a first TA to second TA in the same layer, and then rarely or never returns to the first layer or TA, paging has to be done over all of the layers and TAs in which the UE is registered in. The paging procedure is thus not optimized for such situations, and there is a need for making it possible for the network to make intelligent choices for the paging procedure, in order to reduce the paging overhead.

One typical example of this situation is an urban environment, in which a large number of femto cells of a femto layer are likely to be located within the coverage of a macro layer. When, e.g., a UE is connected to the femto layer, the UE is registered in a TA of the femto layer and a RA/TA of the macro layer at the same time. In the evening, the user of the UE usually goes home and stays at home over the night. At night, paging is thus most likely to be successful on the femto layer, in a femto TA covering his home. It would thus be a waste of paging overhead to page the UE in all of the RAs/TAs of the femto layer and the macro layer. It would be beneficial for the network to detect this user scenario, i.e., the behavior of the UE, and optimize the paging procedure accordingly.

Paging should thus be done in the TA and layer, in which it is most probable that the UE is staying when paging is done. The network thus has to find out in which TA and layer the UE most probably is, in order to be able to reduce the paging signaling overhead. According to this embodiment of the present invention, the most probable current location of the UE is estimated based on the history information of the UE. The history information of the UE is included in the time period information. Therefore, according to this embodiment of the present invention, the most probable location of the UE is estimated based on the time period information reported from the UE.

According to the disclosure, the network prioritizes the TA and layer in which the UE has spent the longest time, and the TA and layer from which the UE did produce the latest time period report, the latter being a deterministic location of the UE, known by the network. For the time period report example shown in FIG. 3, the network would, according to this embodiment of the present invention, first page the UE in TA1 of LTE, in which the UE spent 90% of the past hour and produced the latest time period report.

It is possible that the TA, in which the UE spent most of its time, is not the same TA as the one in which the UE did produce the latest time period report. In this case, the UE should, according to an embodiment of the invention, be paged in two TAs, one TA in which the UE spent the most time and one TA in which the UE produced the latest time period report.

Further, when the UE registers with multiple different layers and TAs at the same time, a TA list, including these different multiple layers and TAs, is created. This TA list is utilized when paging the UE, i.e., to keep track of where to page the UE in the system. If the actions of the UE in the system is not taken into account, the TA list will be out of date and a paging overhead will result. Thus, according to the present disclosure, in order to be able to page the UE efficiently, this TA list needs to be adapted in accordance with the behavior of the UE.

By utilizing the time period reports from the UE, the network can, according to an embodiment of the present invention, reconfigure the TA for the UE. For example, if the UE, within a certain observation time window, has spent all its time in one TA, the network reconfigures the TA list for the UE by a TAU Accept message ordering the UE to reduce the number of TAs in the TA list.

Figure 4:
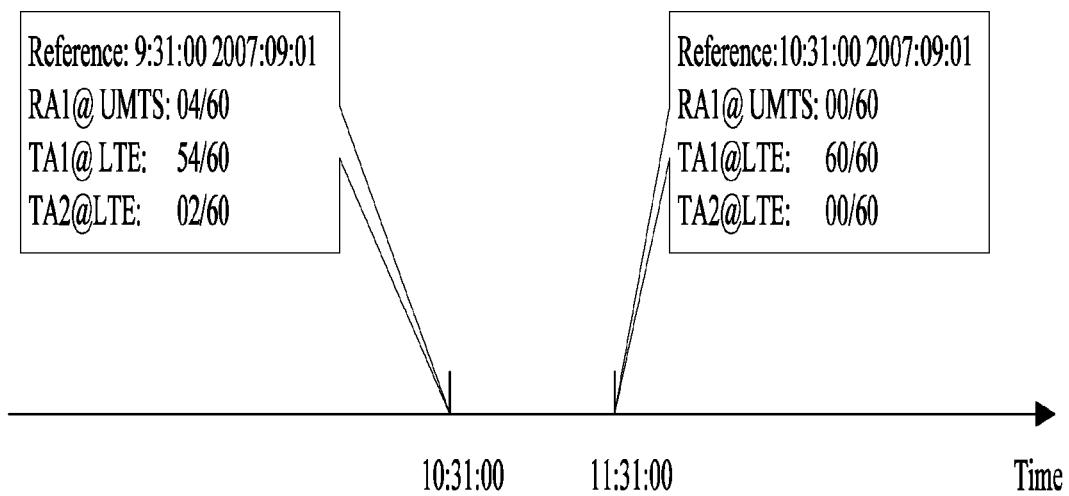
FIG. 4 shows examples of time information reports.

FIG. 4 illustrates an example of this procedure. In FIG. 4, at 10:31:00, the network receives a report from the UE showing that the UE has spent 54 minutes in TA1 of LTE in the last hour. At 11:31:00, the report shows that the UE has spent the whole last hour in TA1 of LTE. According to the present disclosure, in this example, the network would reconfigure the TA list so that it only contains TA1 in a TAU Accept message to the UE. This reconfiguration significantly improves the accuracy of paging and lowers the paging overhead. Thereby, the overall performance of the system is improved.

Further, when the UE registers with different layers or multiple TAs at the same time, the network needs to hold multiple contexts for the UE for all of these TAs or layers. However, if the UE turns out to be in just one of the layers or TAs most of its time, this is a suboptimal way of allocating resources in the network, which needs to be improved.

According to an embodiment of the present invention, the network reconfigures the UE to release, based on the behavior of the UE, some context resources that are unnecessarily kept for the UE. This embodiment of the present invention thus provides an approach for allowing optimization of core network resource allocation by utilizing time information received in reports from the UE, where the time information relates to the time periods the US has been present in each individual layer or TA in which it is registered.

FIG. 4 illustrates an example, which shows how the network can use the time period reports to implement context resource allocation. In the example illustrated in FIG. 5, TA1 is managed by MME1 and TA2 is managed by MME2. As was described above in connection with FIG. 4, the MME1 reconfigures, since the UE has only been present in TA1 in LTE, the TA list for the UE so that it only contains TA1. According to this embodiment of the invention, MME1 then signals MME2 to instruct MME2 to release the context information kept for TA2 for the UE. MME1 and MME2 communicate with each other via an interface between the MMEs.

FIG. 4 also shows another example of registration of the UE with two systems, UMTS and LTE, at the same time. Within the observation time window from 10:31:00 to 11:31:00, the UE was never in RA1 of the UMTS layer. In this case, according to this embodiment of the invention, the MME in SAE/LTE network signals to the SGSN, which manage the NAS connection for the UMTS layer, to order the SGSN to release the NAS connection and further to release the context resources.

However, releasing context resources must be performed very carefully, since it may have an impact on the paging performance or cause connection setup delays in the system. Therefore, according to the present disclosure, the time period distribution should be observed in a sufficiently long time window. For example, if the network determines that the UE has not been present in a certain TA during at lease two consecutive TAU intervals, context resources for the UE in that TA may be released. As is clear for a skilled person, the length of this time window may be adjusted into a large number of values, taking into account paging performance, setup delays and resource allocation, so that the overall system performance is optimized for specific needs.

According to an embodiment of the present invention, network resources allocated for the UE in a specific sub-area, such as a TA, should not be released if the time information indicates that the UE has been present in that specific sub-area close before the end of the reporting period, and then has moved to another sub-area. Such time period information could mean that the UE is going to this specific sub-area again and that the resources therefore should be kept for the UE in this specific sub-area.

As an example, the resources may be kept if the UE has been present in that specific sub-area at least 1% of the time, close before the time information is reported. As is clear for a skilled person, this specific percentage value can be varied in order to optimize performance of the system.

An example of such a situation may be if a user of a UE first stays at home, in a sub-area of a femto layer, for a long time, then quickly goes to a nearby store, sub-area of a macro layer, and then goes back home again, from where time information is reported. It is here likely that the user will go back to the store again or somewhere else in the macro layer, and therefore the resources should be kept for the UE in the sub-area of the macro layer.

Further, in a telecommunication system where radio coverage is supposed to have a consistent coverage, for example, in systems where TAs are meant to overlap each other, it is a problem to determine spots having coverage problems. According to an embodiment of the present invention, the behavior of the UE is utilized to identify problematic tracking areas in a statistical way.

That is, by analyzing the time periods spent by a UE in different sub-areas, such as TAs, it is possible for the network to draw conclusions relating to coverage problems in these sub-areas. For example, if TA1 and TA2 are overlapping TAs in the system and both TA1 and TA2 have been designed to provide consistent coverage, then a UE being in the coverage area of TA1 or TA2 should stay in one of TA1 or TA2 the whole time under normal conditions. But, if the UE spends, for example, around 50% in TA1 and 50% in TA2, this means that there are coverage holes in TA1 or TA2, which have forced the UE to leave one TA to jump to another.

In short, if the network notices that a UE has been forced to leave a TA, where the UE should have had a good coverage, this can, according to the present disclosure, be an indication of a problematic situation in that TA. According to this embodiment of the present invention, the network knows if the UE has been forced to leave a TA from analyzing the behavior of the UE, which is provided to the network through the time information, indicating the time periods the UE has been present in each of the TAs. Thus, if the UE has spent less than a majority of the time in a sub-area in which the UE should have good coverage, it is an indication of that this sub-area has coverage problems. This embodiment of the invention makes it possible for an operator to trigger further measurements and investigations of the problem.

Figure 5:
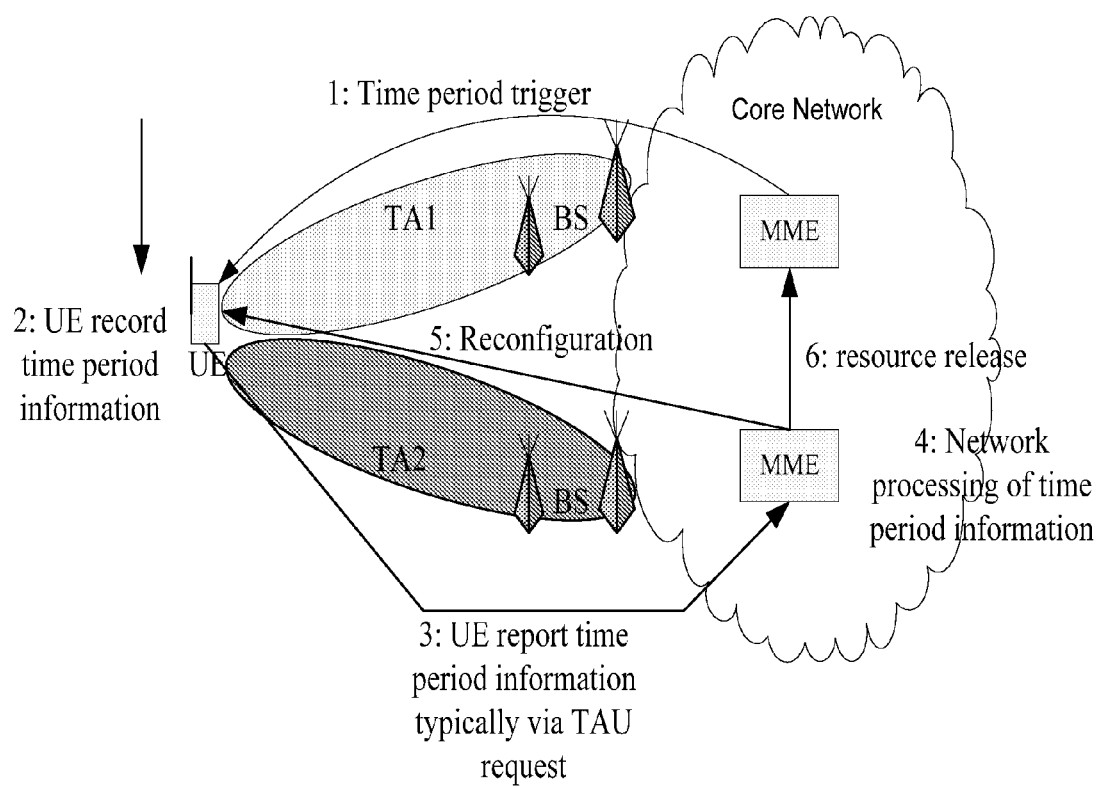
FIG. 5 shows an overview of the time information triggering, reporting and usage.

FIG. 5 illustrates an overview of the time period information reporting procedure and how the time information can be utilized at the network side to optimize NAS signaling and also to allocate network resources:

"Time period trigger" tells the UE that it should start recording time information. The time period trigger can have different forms for different scenarios. For instance, if the UE registers in more than one network, the time period trigger telling the UE to start time period recording can be a successful registration with a second network, such as an attach accept in LTE. As another example, for an UE being registered in multiple tracking areas within one network, the time period trigger can be that one TA list, received by the UE in a tracking area accept or an attach accept message, contains more than one TA.

"UE record time period information" indicates that the UE records time information relating to the time period it has spent in each of the sub-areas, as has been described above.

"UE reports time period information typically via TAU request" indicates that the UE sends the recorded time information to the network node.

"Network processing of time period information" indicates that the network node utilizes the received time information to determine network parameters. That is, based on the time period information in each sub-area, such as TA, the network node may decide, e.g., to the paging parameters for the UE and possibly also to adapt the resource allocation by releasing some context resource at the network side.

"Reconfiguration" indicates that the MME informs the UE of the new determined network parameters, such as, for example, a new TA list.

"Resource release" indicates that the MME that has processed the time information, based on decisions made from this time information, possibly orders another MME to release context resources, via a MME interface.

Figure 6:
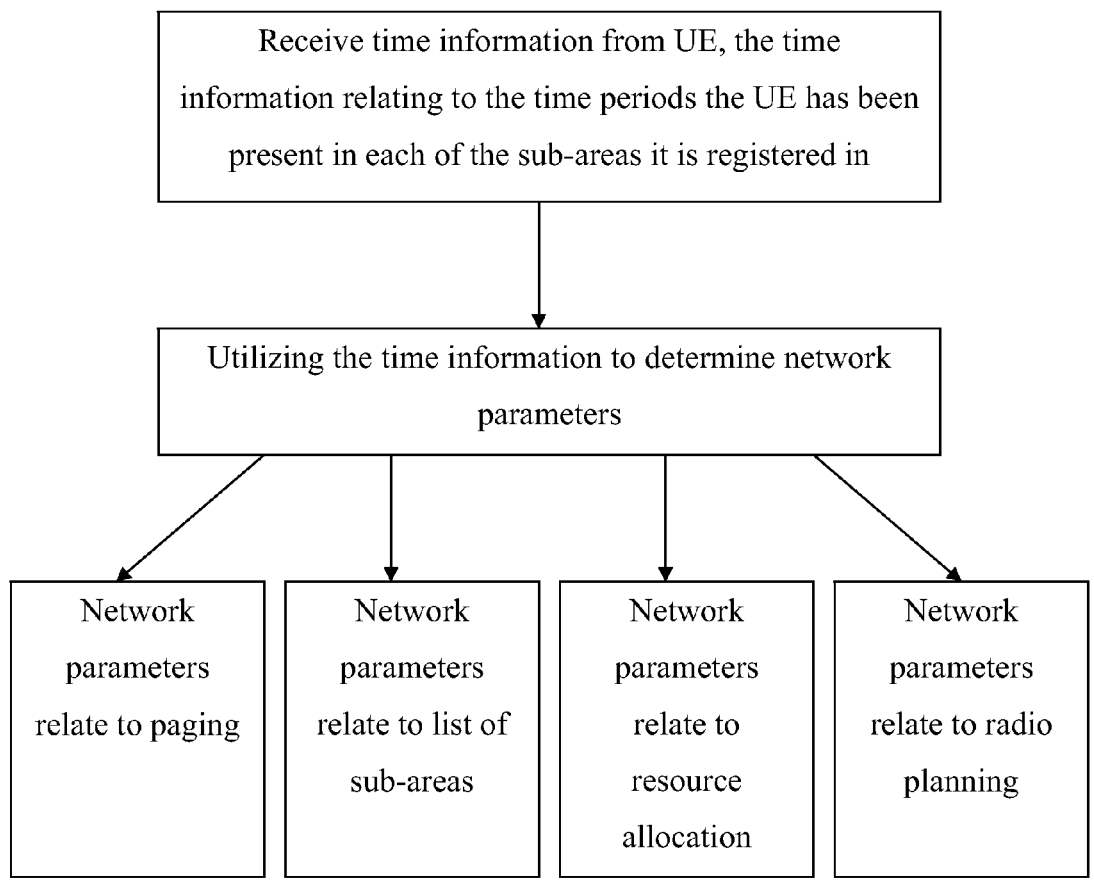
FIG. 6 shows a flowchart for the method of a network node working in accordance with the present disclosure.

FIG. 6 illustrates processes of a method according to the present disclosure, being performed by a network node in a system having a coverage area being made up sub-areas. In the first process, the network node receives, from a UE being in idle mode and being registered in multiple sub-areas, time information relating to the time periods the UE has been present in each of the multiple sub-areas it is registered in.

In the second process of the method, the network node utilizes this time information to determine network parameters in the system. As is illustrated in FIG. 6, these network parameters can be related to paging, sub-area lists, resource allocation, and radio planning.

Figure 7:
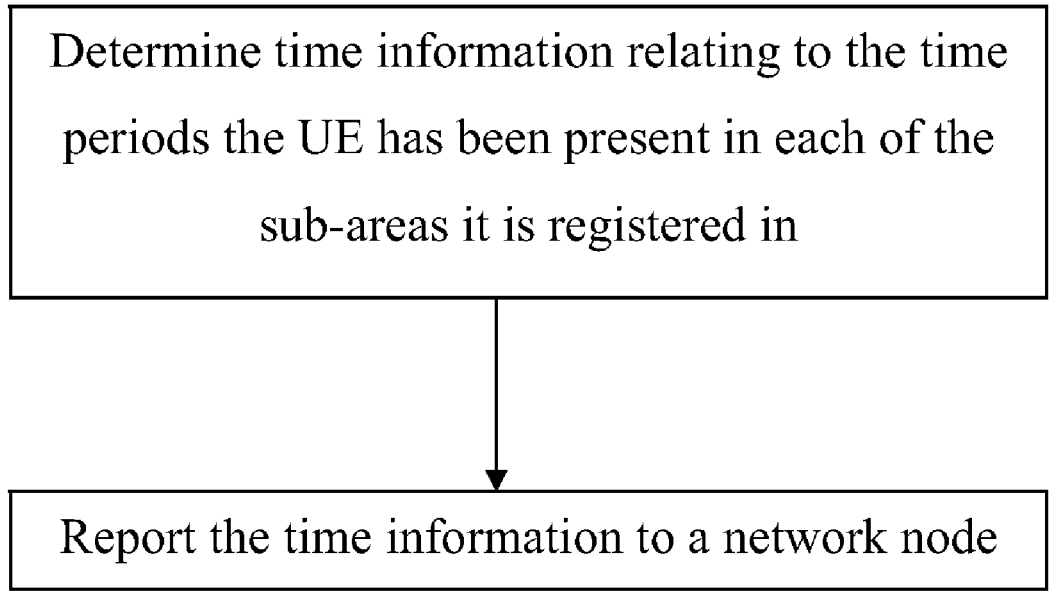
FIG. 7 shows a flowchart for the method of a UE working in accordance with the present disclosure.

FIG. 7 illustrates processes of a method according to the present disclosure, being performed by a UE in a system having a coverage area being made up of sub-areas. In the first process, the UE determines time information relating to the time periods the UE has been present in each of the multiple sub-areas it is registered in. In the second process of the method, the UE reports this time information to the network node.

The different processes of the method of the disclosure described above can be combined or performed in any suitable order. A condition for this is, of course, that the requirements of a process, to be used in conjunction with another process of the method of the disclosure, in terms of time information, paging, TA lists, radio planning, etc., must be fulfilled.

The method of the disclosure can be implemented by a computer program, having code means, which when run in a computer causes the computer to execute the processes of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Further, the present disclosure also includes apparatus, such as a network node, a UE and a system, for implementing the above described methods.

A network node, according to an embodiment of the present invention, is arranged for determining network parameters in a telecommunication system having a coverage area being made up from at least two sub-areas, where the system includes a UE being in idle mode and being registered in at least two of these sub-areas. The network node includes means for receiving a time information relating to the time periods the UE has been present in each of the at least two sub-areas it is registered in, respectively. The network node also includes means for utilizing this received time information to determine network parameters in the system.

In different embodiments of the invention, as has been described above, the network parameters relate to paging, reconfiguration of a sub-area list, resource allocation, and radio planning.

A UE, according to the present disclosure, is arranged for, in idle mode, reporting information in the telecommunication system. The UE includes means for determining a time information relating to the time periods the UE has been present in each of the at least two sub-areas it is registered in, respectively. The UE also includes, means for reporting this time information to a network node in the system.

A telecommunication system, according to the present disclosure, is arranged for determining network parameters. The system has a coverage area being made up from at least two sub-areas, and includes a User Equipment (UE) being in idle mode and being registered in at least two of these sub-areas. The system includes means for, in a network node in the system, receiving from the UE a time information relating to the time periods the UE has been present in each of the at least two sub-areas it is registered in, respectively. The system also includes means for utilizing the time information to determine network parameters in the system.

The network node, the UE and the system of the disclosure can be arranged to include means for performing any of the processes of the method of the disclosure. A trivial requirement is, of course, that such a process does involve the network node and the UE, respectively.

Determination of network parameters according to the disclosure may be modified by those skilled in the art, as compared to the exemplary embodiments described above.

What is claimed is:

1. A method of determining a network parameter in a telecommunication system comprising:
receiving, in a network node of the system, time information from a user equipment, UE, the time information relates to time periods the UE has been present in each of at least two sub-areas of the system in which the UE is registered,
utilizing the time information to determine a network parameter relating to network resource allocation of the system, and
releasing network resource allocated for the UE in a first sub-area of the at least two sub-areas if the time information indicates that the UE has not been present in the first sub-area for two or more periodic Tracking Area Update, TAU, intervals.

2. The method of claim 1, wherein the network parameter relates to paging.

3. The method of claim 1, wherein the time information is used to identify a sub-area of the at least two sub-areas in which the UE is most probably present.

4. The method of claim 1, wherein the network parameter is used for reconfiguration of a list comprising the at least two sub-areas.

5. The method of claim 4, wherein the list is a Tracking Area, TA, list, and an updated TA list is communicated to the UE in a TAU Accept message from the network node.

6. The method of claim 1, wherein at least one of the at least two sub-areas is a Tracking Area.

7. The method of claim 1, wherein the at least two sub-areas are arranged in at least two layers, and at least one of the at least two layers is one in the group of: Long Term Evolution (LTE), Universal Mobile Telecommunications System (UMTS), Global System for Mobile Communications (GSM), Worldwide Interoperability for Microwave Access (WiMAX), Code Division Multiple Access 2000 (CDMA2000).

8. A non-transitory computer program product comprising a computer readable medium and a computer program, the computer program included in the computer readable medium, wherein the computer program comprises code, which when run in a computer causes the computer to execute the method according to claim 1.

9. A method of determining a network parameter in a telecommunication system, comprising:
receiving, in a network node of the system, time information from a user equipment, UE, the time information relates to time periods the UE has been present in each of at least two sub-areas of the system in which the UE is registered, and
utilizing the time information to determine a network parameter relating to radio planning of the system, wherein the radio planning relates to determining coverage in the at least two sub-areas, and the coverage is determined as being problematic if it is determined, based on the time information, that the UE has been present less than a majority of time in a sub-area of the at least two sub-areas.

10. A non-transitory computer program product comprising a computer readable medium and a computer program, the computer program included in the computer readable medium, wherein the computer program comprises code, which when run in a computer causes the computer to execute the method according to claim 9.

11. A method of reporting information in a telecommunication system comprising:
determining time information relating to time periods a user equipment, UE, has been present in each of at least two sub-areas of the system in which the UE is registered, and
reporting the time information to a network node in the system, wherein the time information is used for determining a network parameter relating to network resource allocation of the system, and network resource allocated for the UE is released in a first sub-area of the at least two sub-areas if the time information indicates that the UE has not been present in the first sub-area for two or more periodic Tracking Area Update, TAU, intervals.

12. The method of claim 11, wherein the time information is included in a Tracking Area Update Request from the UE to the network node.

13. The method of claim 11, wherein the time information fulfils any of the following conditions:
the time information comprises time stamps indicating dates and time periods for moments the UE has been present in each of the at least two sub-areas;
the time information comprises relative time stamps, indicating, in relation to a reference date and time, the time periods the UE has been present in each of the at least two sub-areas;
the time information comprises percentages of time indicating, in relation to a reference date and time, that the percentages of time the UE has been present in each of the at least two sub-areas; or
the time information comprises fractions of time indicating, in relation to a reference date and time, the fractions of time the UE has been present in each of the at least two sub-areas, respectively.

14. A network node arranged for determining a network parameter in a telecommunication system comprising:
a module configured to receive time information relating to time periods that a user equipment, UE, has been present in each of at least two sub-areas of the system in which the UE is registered; and
a module configured to utilize the time information to determine a network parameter relating to network resource allocation in the system, wherein the time information is used for releasing network resource allocated for the UE in a first sub-area of the at least two sub-areas if the time information indicates that the UE has not been present in the first sub-area for two or more periodic Tracking Area Update, TAU, intervals.

15. A telecommunication system comprising a User Equipment (UE), the UE being arranged for reporting information in the system, the UE comprising:
a module configured to determine time information relating to time periods that the UE has been present in each of at least two sub-areas of the system in which the UE is registered, and
a module configured to report the time information to a network node in the system, wherein the time information is used for determining a network parameter relating to network resource allocation of the system, and network resource allocated for the UE is released in a first sub-area of the at least two sub-areas if the time information indicates that the UE has not been present in the first sub-area for two or more periodic Tracking Area Update, TAU, intervals.

16. A method of reporting information in a telecommunication system, comprising:
- determining time information relating to time periods a user equipment, UE, has been present in each of at least two sub-areas of the system in which the UE is registered, and
- reporting the time information to a network node in the system, wherein the time information is used for determining a network parameter relating to radio planning of the system, and the radio planning relates to determining coverage in the at least two sub-areas, and the coverage is determined as being problematic if it is determined, based on the time information, that the UE has been present less than a majority of time in a sub-area of the at least two sub-areas.

17. A network node arranged for determining a network parameter in a telecommunication system, comprising:
- a module configured to receive time information relating to time periods that a user equipment, UE, has been present in each of at least two sub-areas of the system in which the UE is registered; and
- a module configured to utilize the time information to determine a network parameter relating to radio planning in the system, wherein the radio planning relates to determining coverage in the at least two sub-areas, and the coverage is determined as being problematic if it is determined, based on the time information, that the UE has been present less than a majority of time in a sub-area of the at least two sub-areas.

18. A telecommunication system comprising a User Equipment (UE), the UE being arranged for reporting information in the system, the UE comprising:
- a module configured to determine time information relating to time periods that the UE has been present in each of at least two sub-areas of the system in which the UE is registered, and
- a module configured to report the time information to a network node in the system, wherein the time information is used for determining a network parameter relating to radio planning in the system, the radio planning relates to determining coverage in the at least two sub-areas, and the coverage is determined as being problematic if it is determined, based on the time information, that the UE has been present less than a majority of time in a sub-area of the at least two sub-areas.

* * * * *